(12) United States Patent
Bae et al.

(10) Patent No.: US 10,973,015 B2
(45) Date of Patent: Apr. 6, 2021

(54) METHOD FOR PERFORMING UPLINK TRANSMISSION IN A WIRELESS COMMUNICATION SYSTEM AND APPARATUS THEREFOR

(71) Applicant: LG Electronics Inc., Seoul (KR)

(72) Inventors: Duckhyun Bae, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/410,583

(22) Filed: May 13, 2019

(65) Prior Publication Data

US 2019/0373588 A1 Dec. 5, 2019

Related U.S. Application Data

(60) Provisional application No. 62/675,673, filed on May 23, 2018, provisional application No. 62/670,027, filed on May 11, 2018.

(51) Int. Cl.
*H04W 72/04* (2009.01)
*H04W 76/27* (2018.01)
(Continued)

(52) U.S. Cl.
CPC ......... *H04W 72/042* (2013.01); *H04L 1/1812* (2013.01); *H04W 72/1289* (2013.01); *H04W 76/27* (2018.02)

(58) Field of Classification Search
CPC .............................. H04W 72/042; H04W 76/27
See application file for complete search history.

(56) References Cited

U.S. PATENT DOCUMENTS

| 2017/0048828 | A1 | 2/2017 | Um et al. |
| 2018/0019794 | A1 | 1/2018 | Kowalski et al. |
| 2019/0021045 | A1* | 1/2019 | Kim .................... H04W 72/042 |

FOREIGN PATENT DOCUMENTS

| EP | 3288327 | 2/2018 |
| JP | 2579489 | 4/2013 |

(Continued)

OTHER PUBLICATIONS

Huawei, HiSilicon, "Remaining issues for SPS procedures," R1-1611135, 3GPP TSG RAN WG1 Meeting #87, Reno, USA, dated Nov. 14-18, 2016, 2 pages.

(Continued)

*Primary Examiner* — Angel T Brockman
(74) *Attorney, Agent, or Firm* — Fish & Richardson P.C.

(57) ABSTRACT

A method of performing, by a user equipment (UE), uplink transmission in a wireless communication system. The method includes: receiving, from a base station (BS), a plurality of RRC configuration information related to downlink control information (DCI); receiving, from the BS, first DCI for the uplink transmission, wherein the first DCI includes a field related to a usage of the first DCI; applying parameters of a specific RRC configuration information, among the plurality of RRC configuration information, to the first DCI based on the usage of the first DCI indicated by the field of the first DCI, wherein based on a size of the field of the first DCI being smaller than a field size of second DCI for PUSCH transmission, the field of the first DCI is zero bit padded and decoded; and performing the uplink transmission to the BS based on the first DCI.

16 Claims, 12 Drawing Sheets

(51) Int. Cl.
*H04L 1/18* (2006.01)
*H04W 72/12* (2009.01)

(56) References Cited

FOREIGN PATENT DOCUMENTS

| WO | WO2016021949 | 2/2016 |
|---|---|---|
| WO | WO2017171525 | 10/2017 |
| WO | WO2018003913 | 1/2018 |

OTHER PUBLICATIONS

Intel Corporation, "On compact DCI format for NR URLLC," R1-1804740, 3GPP TSG RAN WG1 Meeting #92bis, Sanya, China, dated Apr. 16-20, 2018, 7 pages.

Samsung, "DCI Contents and Formats," R1-1801976, 3GPP TSG RAN WG1 Meeting #92, Athens, Greece, dated Feb. 26-Mar. 2, 2018, 6 pages.

NTT Docomo, Inc., "DCI contents and formats," R1-1802482, 3GPP TSG RAN WG1 Meeting #92, Athens, Greece, dated Feb. 26-Mar. 2, 2018, 9 pages.

Panasonic, "DCI format 1_0 with X-RNTIs," R1-1805080, 3GPP TSG RAN WG1#92bis, Sanya, China, dated Apr. 16-20, 2018, 5 pages.

Extended European Search Report in European Application No. 19174152.9, dated Sep. 2, 2019, 7 pages.

Japanese Office Action in Japanese Appln. No. 2019-090999, dated Oct. 20, 2020, 8 pages (with English translation).

NTT Docomo, Inc., "Offline summary for AI 7.1.3.3.4 UL data transmission procedure," R1-1805539, 3GPP TSG RAN WG1 Meeting #92bis, Sanya, China, Apr. 16-20, 2018, 13 pages.

IN Office Action in Indian Appln. No. 201927037482, dated Jan. 29, 2021, 7 pages (with English translation).

* cited by examiner

METHOD FOR PERFORMING UPLINK TRANSMISSION IN A WIRELESS COMMUNICATION SYSTEM AND APPARATUS THEREFOR

CROSS-REFERENCE TO RELATED APPLICATIONS

The present application claims the benefit of an earlier filing date and right of priority to Provisional Application No. 62/670,027 filed on 11 May 2018 and Provisional Application No. 62/675,673 filed on 23 May 2018 in US the contents of which are hereby incorporated by reference in its entirety.

TECHNICAL FIELD

The present disclosure generally relates to a wireless communication system and, more particularly, to performing uplink transmission.

BACKGROUND

Mobile communication systems have been developed to provide a voice service while ensuring activity and mobility of users. However, mobile communication systems have been extended to provide not only voice service but also data service, resulting in explosive increase in traffic and shortage of resources. To meet the demands of users expecting higher speed service, more advanced mobile communication systems are required.

Requirements of a next-generation mobile communication system should be able to support increased data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY

Implementations are disclosed herein for performing uplink transmission in a wireless communication system.

One general aspect of the present disclosure includes a method of performing, by a user equipment (UE), uplink transmission in a wireless communication system, the method including: receiving, from a base station (BS), a plurality of radio resource control (RRC) configuration information related to downlink control information (DCI). The method also includes receiving, from the BS, first DCI for the uplink transmission, where the first DCI includes a field related to a usage of the first DCI. The method also includes applying parameters of a specific RRC configuration information, among the plurality of RRC configuration information, to the first DCI based on the usage of the first DCI indicated by the field of the first DCI, where based on a size of the field of the first DCI being smaller than a field size of second DCI for physical uplink shared channel (PUSCH) transmission, the field of the first DCI is zero bit padded and decoded. The method also includes performing the uplink transmission to the BS based on the first DCI. Other embodiments of this aspect include corresponding computer systems, apparatus, and computer programs recorded on one or more computer storage devices, each configured to perform the actions of the methods.

Implementations may include one or more of the following features. The method where the first DCI is scrambled by a configured scheduling radio network temporary identifier (CS-RNTI). The method where the second DCI for the PUSCH transmission is scrambled by a cell RNTI (C-RNTI). The method where the field of the first DCI related to the usage of the first DCI is any one of (i) a "new data indicator (NDI)" field, (ii) a "redundancy version (RV)" field, or (iii) a "hybrid automatic repeat request (HARQ) process number" field. The method where the field of the first DCI is zero bit padded by inserting a 0 as a bit within the field until the size of the field of the first DCI is identical with the field size of the second DCI for the PUSCH transmission. The method where the field of the first DCI is zero bit padded by inserting a 0 as a most significant bit (MSB) or a least significant bit (LSB) within the field of the first DCI. The method where the field of the first DCI that is related to the usage of the first DCI is positioned in the first DCI after a common field that is configured regardless of the usage of the first DCI. The method where based on the size of the field of the first DCI related to the usage of the first DCI being greater than the field size of the second DCI for the PUSCH transmission, the first DCI is invalid. Implementations of the described techniques may include hardware, a method or process, or computer software on a computer-accessible medium.

Another general aspect of the present disclosure includes a user equipment (UE) configured to perform uplink transmission in a wireless communication system, the UE including: a radio frequency (RF) module. The user equipment also includes at least one processor; and at least one computer memory operably connectable to the at least one processor and storing instructions that, when executed by the at least one processor, perform operations including: receiving, from a base station (BS), a plurality of RRC configuration information related to downlink control information (DCI). The operations also include receiving, from the BS, first DCI for the uplink transmission, where the first DCI includes a field related to a usage of the first DCI. The operations also include applying parameters of a specific RRC configuration information, among the plurality of RRC configuration information, to the first DCI based on the usage of the first DCI indicated by the field of the first DCI, where based on a size of the field of the first DCI being smaller than a field size of second DCI for PUSCH transmission, the field of the first DCI is zero bit padded and decoded. The operations also include performing the uplink transmission to the BS based on the first DCI. Other embodiments of this aspect include corresponding computer systems, apparatus, and computer programs recorded on one or more computer storage devices, each configured to perform the actions of the methods.

Implementations may include one or more of the following features. The UE claim 8, where the first DCI is scrambled by a CS-RNTI. The UE where the second DCI for the PUSCH transmission is scrambled by a C-RNTI. The UE where the field of the first DCI related to the usage of the first DCI is any one of (i) a "new data indicator (NDI)" field, (ii) a "redundancy version (RV)" field, or (iii) an "HARQ process number" field. The UE where the field of the first DCI is zero bit padded by inserting a 0 as a bit within the field until the size of the field of the first DCI is identical with the field size of the second DCI for the PUSCH transmission. The UE where the field of the first DCI is zero bit padded by inserting a 0 as a most significant bit (MSB)

or a least significant bit (LSB) within the field of the first DCI. The UE where the field of the first DCI that is related to the usage of the first DCI is positioned in the first DCI after a common field that is configured regardless of the usage of the first DCI. The UE where based on the size of the field of the first DCI related to the usage of the first DCI being greater than the field size of the second DCI for the PUSCH transmission, the first DCI is invalid. Implementations of the described techniques may include hardware, a method or process, or computer software on a computer-accessible medium.

Another general aspect of the present disclosure includes a method of receiving, by a base station, uplink transmission in a wireless communication system, the method including: transmitting, to a user equipment (UE), a plurality of RRC configuration information related to downlink control information (DCI). The method also includes transmitting, to the UE, first DCI for the uplink transmission, where the first DCI includes a field related to a usage of the first DCI. The method also includes receiving, from the UE, the uplink transmission based on first DCI to which parameters of a specific RRC configuration information, among the plurality of RRC configuration information, have been applied, based on the usage of the first DCI indicated by the field of the first DCI. Based on a size of the field of the first DCI being smaller than a field size of second DCI for PUSCH transmission, the field of the first DCI is zero bit padded.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Other embodiments of this aspect include corresponding computer systems, apparatus, and computer programs recorded on one or more computer storage devices, each configured to perform the actions of the methods.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

The accompany drawings, which are included as part of the detailed description in order to help understanding of the present invention, provide embodiments of the present invention and describe the technical characteristics of the present invention along with the detailed description.

DETAILED DESCRIPTION

Figure 1:
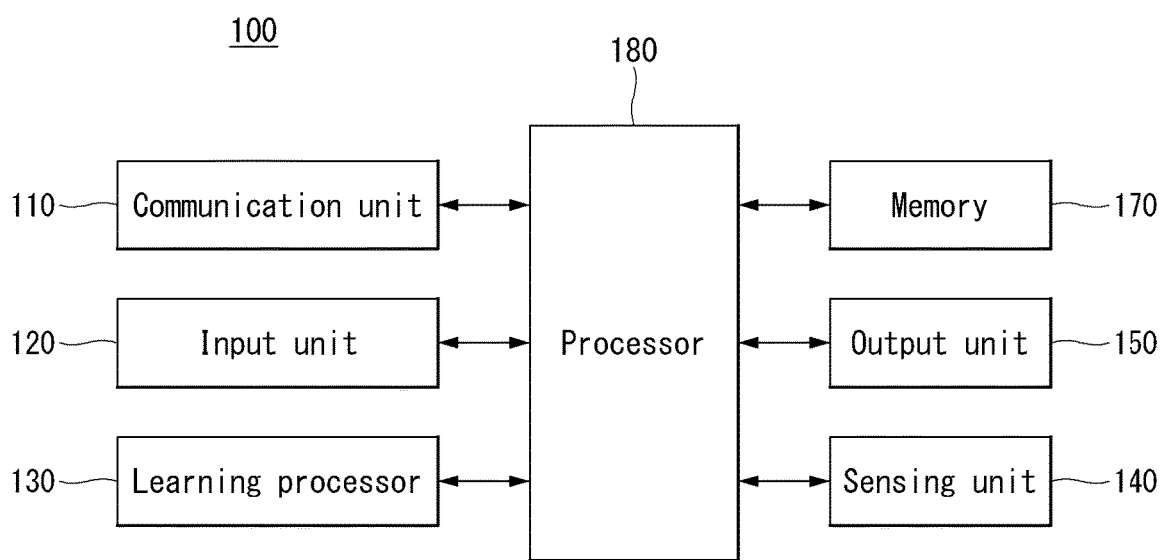
FIG. 1 is a diagram showing an example of an AI device to which implementations of this disclosure may be applied.

Reference will now be made in detail to implementations of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Implementations of the present disclosure can be supported by standard documents disclosed in at least one of IEEE 802, 3GPP, and 3GPP2 which are the wireless access systems. That is, steps or parts in implementations of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

In the present disclosure, CA and/or B' may be interpreted in the same sense as 'including at least one of A or B'.

Hereinafter, examples of 5G use scenarios to which implementations of this disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an example of an AI device 100 to which implementations of this disclosure may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
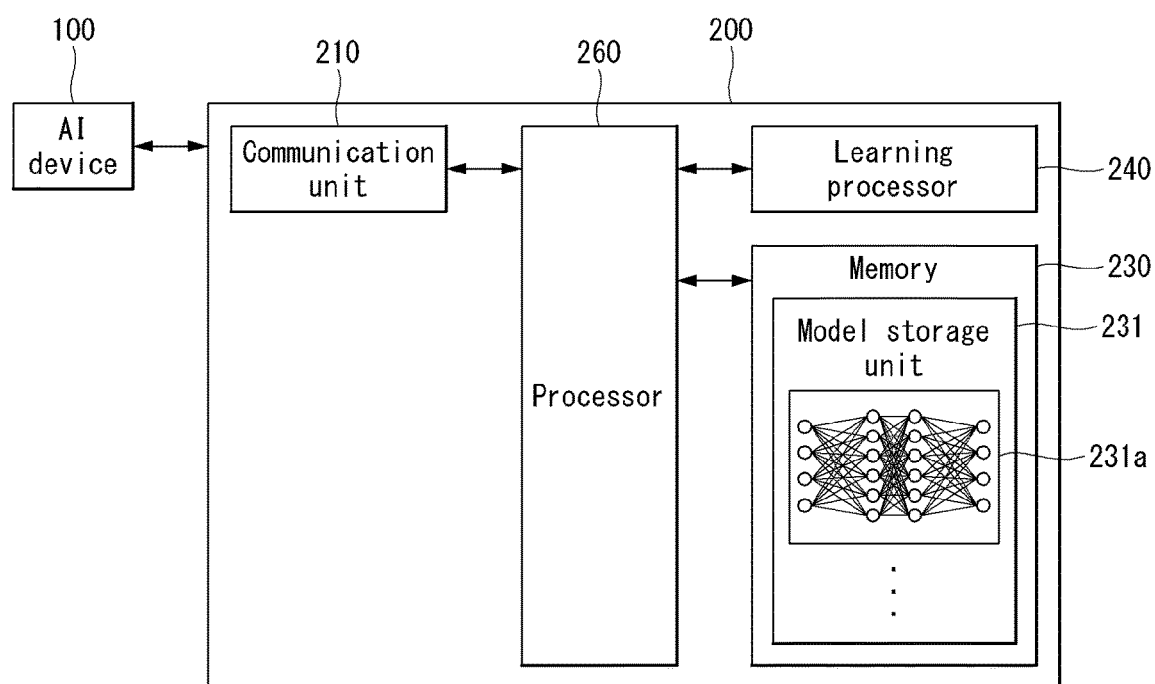
FIG. 2 is a diagram showing an example of an AI server to which implementations of this disclosure may be applied.

FIG. 2 is a diagram showing an example of the AI server 200 to which implementations of this disclosure may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
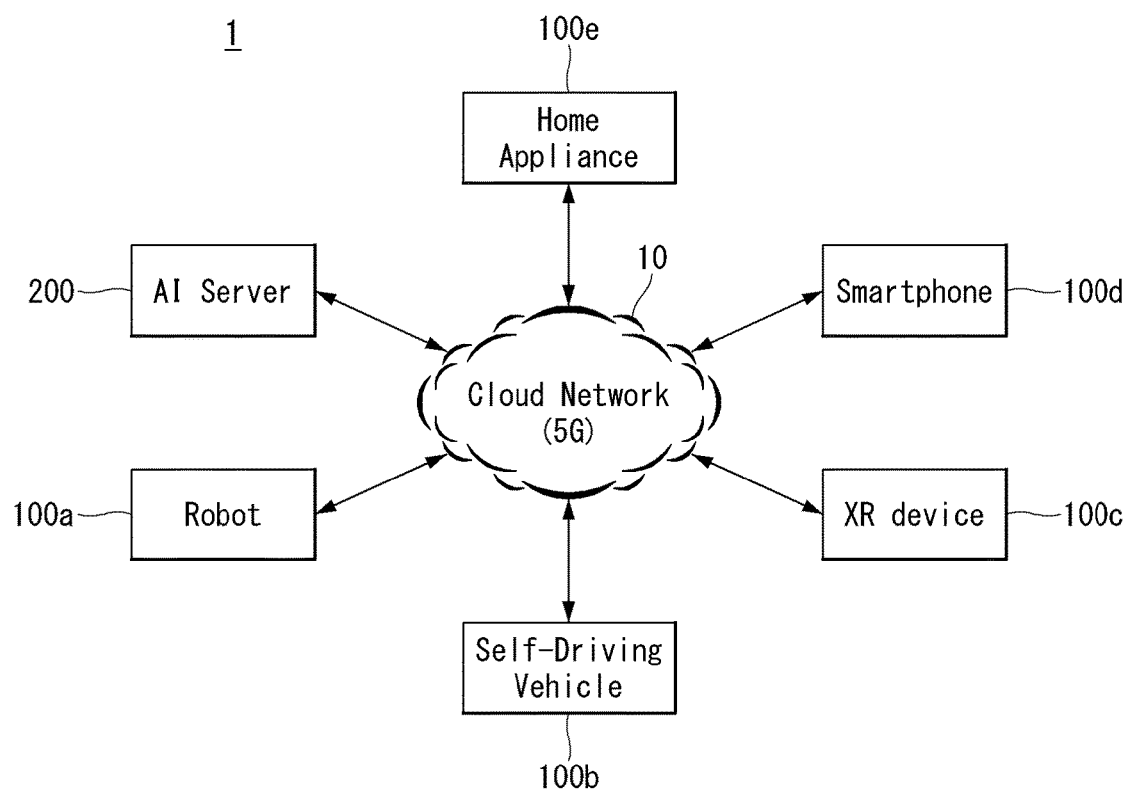
FIG. 3 is a diagram showing an example of an AI system to which implementations of this disclosure may be applied.

FIG. 3 is a diagram showing an example of an AI system 1 to which implementations of this disclosure may be applied.

Referring to FIG. 3, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various implementations of the AI devices 100*a* to 100*e* to which the above-described technology is applied are described. In this case, the AI devices 100*a* to 100*e* shown in FIG. 3 may be considered to be detailed implementations of the AI device 100 shown in FIG. 1.

AI and Robot

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI and Self-Driving

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI and XR

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI, Robot, and Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI, Robot, and XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI, Self-Driving, and XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Description of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one subcarrier spacing in a frequency domain. By scaling a reference subcarrier spacing by an integer N, different numerologies can be defined.

NR: NR radio access or new radio.

General System

Figure 4:
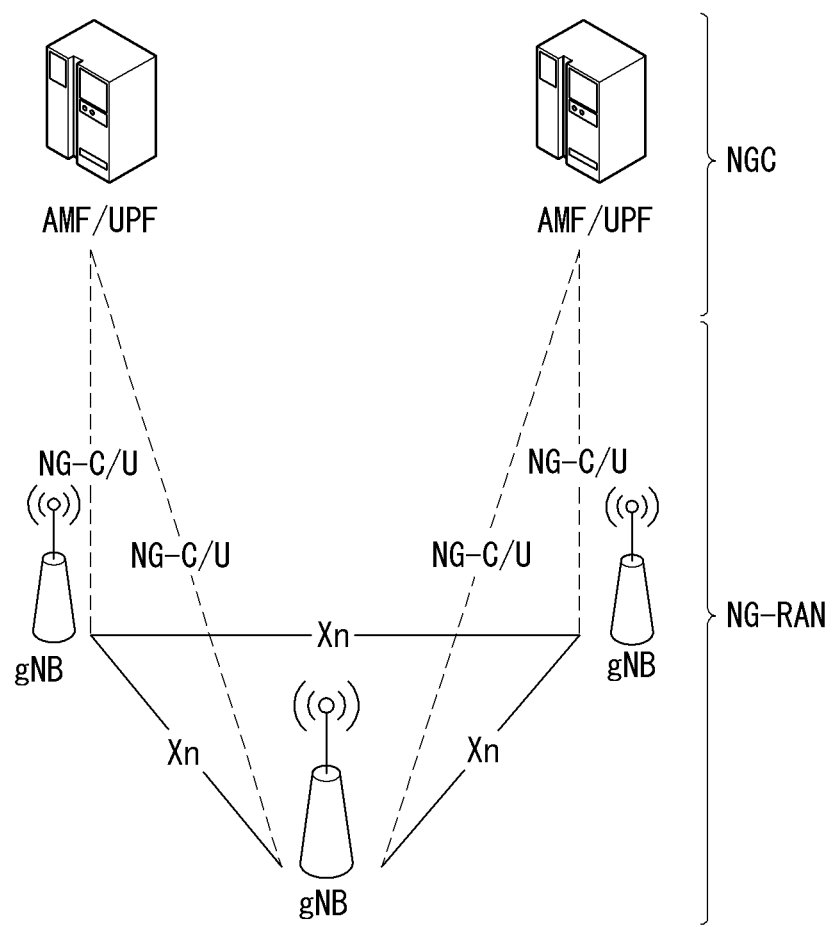
FIG. 4 is a diagram showing an example of a general system configuration of NR to which implementations of this disclosure may be applied.

FIG. 4 illustrates an example of an overall structure of a NR system to which a method described by the present disclosure is applicable.

Referring to FIG. 4, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 5:
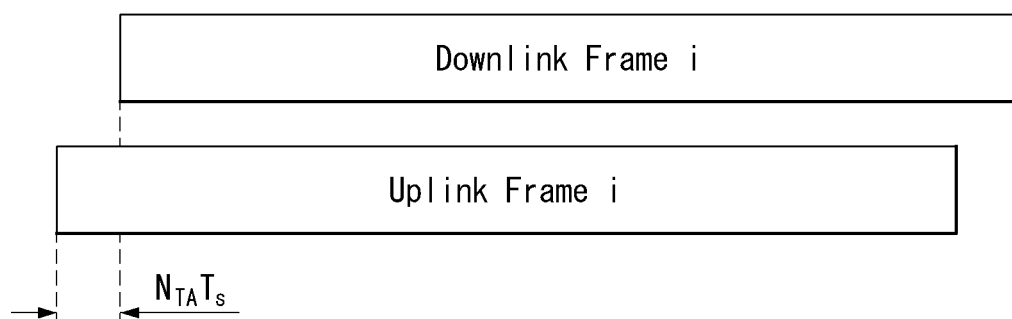
FIG. 5 shows an example of a relation between an uplink frame and a downlink frame in a wireless communication system to which implementations of this disclosure may be applied.

FIG. 5 illustrates an example of a relation between an uplink frame and a downlink frame in a wireless communication system to which an implementation described by the present disclosure is applicable.

As illustrated in FIG. 5, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^{\mu} \in \{0, \ldots, N_{subframe}^{slot,\mu}-1\}$ in a subframe, and in ascending order of $n_{s,f}^{\mu} \in \{0, \ldots, N_{frame}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu} N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 6:
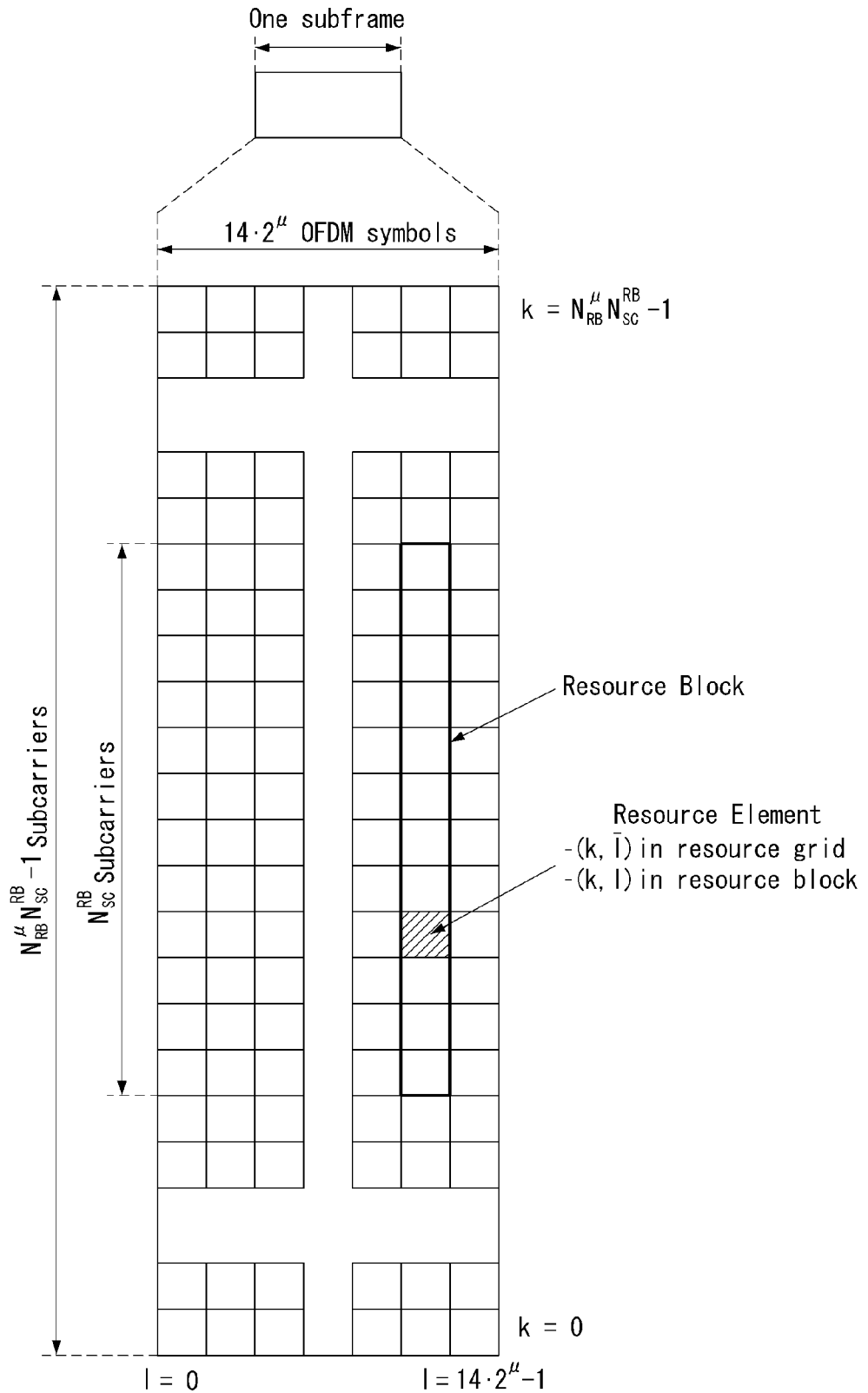
FIG. 6 shows an example of a resource grid supplied in a wireless communication system to which implementations of this disclosure may be applied.

FIG. 6 illustrates an example of a resource grid supported in a wireless communication system to which an implementation described by the present disclosure is applicable.

Referring to FIG. 6, a resource grid is composed of $N_{RB}^{\mu} N_{sc}^{RB}$ subcarriers in a frequency domain, each subframe composed of $14 \cdot 2^{\mu}$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 7:
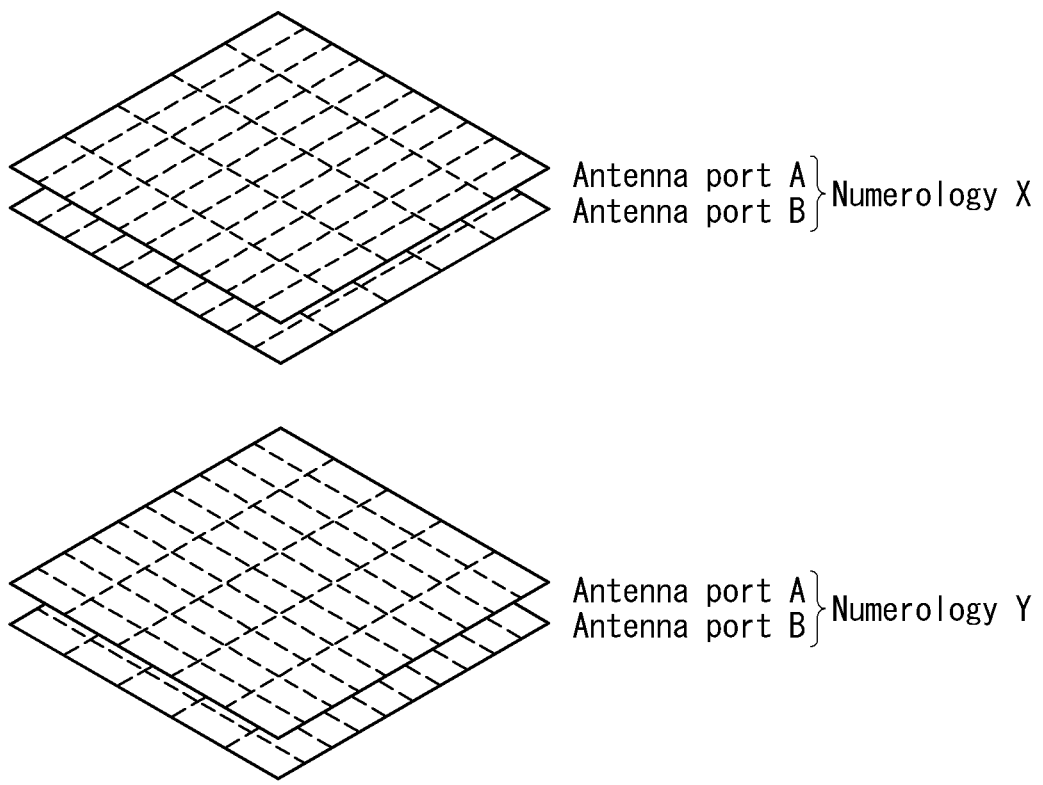
FIG. 7 shows examples of a resource grid for each antenna port and numerology to which implementations of this disclosure may be applied.

In this case, as illustrated in FIG. 7, one resource grid may be configured per the numerology $\mu$ and an antenna port p.

FIG. 7 illustrates examples of a resource grid per antenna port and numerology to which an implementation described by the present disclosure is applicable.

Each element of the resource grid for the numerology $\mu$ and the antenna port p is indicated as a resource element, and may be uniquely identified by an index pair (k,l). Herein, $k=0, \ldots, N_{RB}^{\mu} N_{sc}^{RB} - 1$ is an index in the frequency domain, and $l=0, \ldots, 2^{\mu} N_{symb}^{(\mu)} - 1$ indicates a location of a symbol in a subframe. To indicate a resource element in a slot, the index pair (k,l) is used, where $l=0, \ldots, N_{symb}^{\mu} - 1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and $\mu$ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Slot Structure

Figure 8:
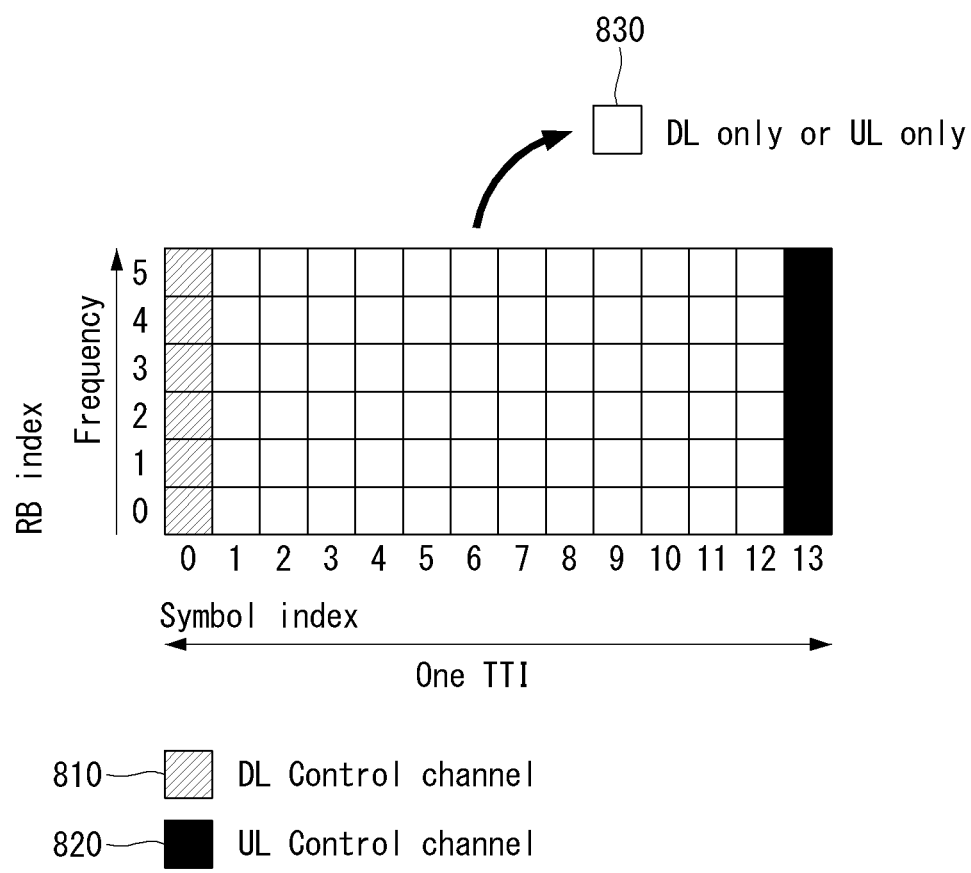
FIG. 8 is a diagram showing an example of a self-contained slot structure to which implementations of this disclosure may be applied.

To minimize latency of data transmission in a TDD system, 5G new RAT (NR) has considered a self-contained slot structure illustrated in FIG. 8.

That is, FIG. 8 illustrates an example of a self-contained slot structure to which an implementation described by the present disclosure is applicable.

In FIG. 8, a hatched portion 810 denotes a downlink control region, and a black portion 820 denotes an uplink control region.

A non-marked portion 830 may be used for downlink data transmission or uplink data transmission.

Such a structure may be characterized in that DL transmission and UL transmission are sequentially performed in one slot, DL data is sent in one slot, and UL Ack/Nack is also transmitted and received in one slot.

Such a slot may be defined as a 'self-contained slot'.

That is, through the slot structure, the base station reduces the time it takes to retransmit data to the UE when a data transmission error occurs, and thus can minimize latency of final data delivery.

In the self-contained slot structure, the base station and the UE require a time gap in a process for switching from a transmission mode to a reception mode or a process for switching from the reception mode to the transmission mode.

To this end, in the corresponding slot structure, some OFDM symbols at time of switching from DL to UL are configured as a guard period (GP).

Analog Beamforming

In the millimeter wave (mmW), multiple antennas may be installed in the same area because a wavelength is short. That is, in a 30 GHz band, a wavelength is 1 cm. A total of 100 antenna elements may be installed in a panel of 5×5 (5 by 5) cm at intervals of 0.5 lambda (i.e., wavelength) in a two-dimensional array form. Accordingly, in the mmW, an attempt to increase coverage or improve the throughput is made by increasing a beamforming (BF) gain using multiple antenna elements.

In this case, if each antenna element has a transceiver unit (TXRU) so that transmission power and a phase can be adjusted, independent beamforming is possible for each frequency resource. However, there is a problem in that effectiveness is low in the price aspect if the TXRUs are installed in all the 100 antenna elements. Accordingly, a method of mapping multiple antenna elements to one TXRU and adjusting the direction of a beam using an analog phase shifter is taken into consideration. Such an analog beamforming method has a disadvantage in that frequency selective BF cannot be performed because only one beam direction can be produced in a full band.

Hybrid BF having B TXRUs, that is, a smaller number than Q antenna elements, as a middle form of digital BF and analog BF, may be taken into consideration. In this case, there is a difference depending on a connection method of the B TXRUs and the Q antenna elements, but the direction of beams that may be transmitted at the same time is restricted to B or less.

In a next-generation system (e.g., 5G), a UE may perform configured grant transmission. In scenarios of configured grant transmission, an uplink transmission is performed in a semi-persistent resource without having received an UL grant before it performs the uplink transmission, depending on an application field and/or the type of traffic. In systems that are compatible with LTE, a similar operation may be performed in the DL and UL through semi-persistent scheduling (SPS). In scenarios of configured grant transmission, a radio resource may be used which is shared by different UEs based on contention. Alternatively, a radio resource may be used which is dedicatedly allocated to a UE. Because a UL grant reception operation is unnecessary prior to configured grant transmission, configured grant transmission may be used in service or traffic of the field that requires lower latency. For such configured grant transmission, scenarios may arise in which a modulation and coding scheme or a transport block size or transmission time (TT) interval is used which is different from those of a radio resource that is allocated through a UL grant. One or multiple radio resources may be allocated to a UE for configured grant transmission. Multiple radio resources used for configured grant transmission may have the same or different sizes or modulations and coding methods, time and/or frequency scheduling units, and overlap between the multiple radio resources may be permitted. In some scenarios, a UE may continuously attempt transmission on the same data several times in order to increase the success ratio of such configured grant transmission. In some implementations of a next-generation system, an RRC configuration separated for configured grant transmission may be performed.

In scenarios of downlink and uplink transmission using semi-persistent scheduling (SPS) and/or using configured grant of a next-generation system (e.g., 5G), particularly, uplink transmission using a configured grant, a separate RRC configuration may be allocated which is different from that of an RRC parameter used for uplink and downlink transmission according to normal DCI.

For example, PUSCH transmission according to a configured grant may use a waveform, a resource allocation type (RA type), etc. which is different from those used in a dynamic uplink grant.

Such a separate configuration typically results in a difference in DCI information which needs to be delivered to a UE.

However, a difference in the DCI information can increase PDCCH blind decoding complexity for a UE. Accordingly, there may arise problems in that a UE's design and/or operation is complicated and power consumption is increased.

Even in scenarios where the DCI size is the same, a UE may still need to check that corresponding DCI has been configured by which parameter in order to interpret a DCI field.

For example, even if scenarios where DCI for configured grant PUSCH transmission has the same size as DCI for dynamic uplink grant PUSCH transmission, a UE may still need to identify that the received DCI is associated with a higher layer parameter of which transmission.

Implementations of this disclosure may resolve such difficulties by ensuring identical sizes of DCI or the sizes of DCI fields, even in scenarios where the DCI is configured by a different RRC parameter.

For example, according to some implementations, when a UE receives the DCI, the UE may check a configuration with which the received DCI is associated.

Furthermore, some implementations may enable one or more of the following features.

A UE may assume that configured scheduling and PUSCH scheduling according to an uplink grant are identically applied for the configuration of one non-fallback DCI size.

If a grant free type 1 or a grant free type 2 is configured in a UE through a waveform according to non-fallback DCI or a different parameter configuration, then the UE may be configured to not expect that an activation/release signal is received through non-fallback DCI. For example, the UE may assume two types:

(i) the UE may assume that all parameters are identically applied to grant-based and grant-free if an activation signal is downloaded through non-fallback DCI;

And (ii) if all parameters are configured so that they are not identically applied to grant-based and grant-free, then the UE may assume that an activation signal is not transmitted through non-fallback DCI.

In such a case, the UE may assume that retransmission for grant-free follows the configuration of a grant-based PUSCH.

For the retransmission of a transport block (TB) transmitted by a configured grant, a UE may need to receive DCI that is scrambled by a configured scheduling-RNTI (CS-RNTI).

Such DCI may also be used for the activation and release of a type 2 configured grant configuration.

In NR, some RRC parameters for a PUSCH according to a configured grant may be configured separately from a PUSCH according to a dynamic grant.

For example, the DCI fields of a configured grant and a dynamic grant may be differently configured.

As a particular example, when a different waveform or resource allocation type is differently configured between a CS and an uplink grant, a DCI field may be differently configured.

However, if activation DCI according to a CS-RNTI has a bit size which is different from that of a dynamic grant according to a C-RNTI, then this may cause increased complexity of blind decoding.

However, increasing complexity merely for activation DCI reception may not be rational or practical in some scenarios.

Implementations of the present disclosure can mitigate such issues by ensuring that the bit sizes of activation DCI and dynamic DCI are the same.

Two example techniques, discussed further below, may be implemented in order for a C-RNTI and a CS-RNTI according to separate RRC configurations to have the same size of DCI.

The first example is a technique for a UE to assume that the same configuration is applied to a CS-RNTI and to a C-RNTI, so that they have the same field format and field size for respective DCI formats.

As such, the first example is a technique for a UE to assume that the same resource allocation and the same waveform configuration will be given by the same DCI format using a CS-RNTI and using a C-RNTI.

The second example is a technique of allowing a potentially different configuration as type 1 or type 2 configurations in a DCI format for a CS-RNTI.

The description below begins with a discussion of DCI format using a CS-RNTI used for retransmission.

In each of the two examples below, techniques of handling for activation and/or deactivation are described.

It should be noted that regardless of the type 1 and/or type 2 configuration, a retransmission grant according to a CS-RNTI using a fallback DCI format may follow the same configuration as an UL grant according to a C-RNTI (e.g., waveform according to Msg3).

In activation using fallback DCI, a UE may assume that the UE still follows the waveform of the type 1 configuration and/or type 2 configuration for uplink transmission based on configured scheduling.

Example 1

In this first example, the non-fallback DCI format of a CS-RNTI may have the type 1 configuration and/or type 2 configuration regardless of retransmission or activation/release.

In order to maintain the same DCI size in this example, a handling technique may be implemented which is similar to that of dynamic BWP switching.

For example, in some implementations, each DCI field size of a CS-RNTI may be arranged identically with each DCI field size of a C-RNTI.

In scenarios where the DCI size of a CS-RNTI requires a larger DCI size than the DCI size of a C-RNTI (e.g., due to a different RA type or waveform), then truncation may be performed.

In other scenarios, zero padding may be performed.

Therefore, in this example, the DCI field and field size of a CS-RNTI may be ensured to be the same as the DCI field and field size of a C-RNTI, and this may be ensured through truncation or zero-padding of the DCI field.

Furthermore, the non-fallback DCI size of each of a CS-RNTI and a C-RNTI may be determined based on a maximum value of a DCI size required for each RNTI.

Example 2

In this second example, the non-fallback DCI format of a CS-RNTI may follow an uplink grant configuration of a C-RNTI for retransmission.

Activation/release may follow type 1 and/or type 2 configurations.

In some implementations, to avoid ambiguity, DCI fields (according to a CS-RNTI and a C-RNTI) including a field size may be arranged.

A UE may determine whether DCI is activation or release based on code points.

Thereafter, while a resource allocation type and/or waveform for the type 1 configuration and/or type 2 configuration is used for release and/or activation, the UE may perform the interpretation of necessary DCI based on a resource allocation type and/or waveform for an uplink grant for retransmission.

Below, some detailed features of the above-described example and of examples other than the above-described example are described.

Handling of Non-Fallback DCI Scrambled by CS-RNTI

In a next-generation system (e.g., 5G), when DCI for DL SPS or configured grant transmission is received, a CS-RNTI may be used.

The CRC parity bit of DCI for DL SPS or configured grant transmission may be scrambled or masked by a CS-RNTI.

In this case, after receiving the DCI, a UE may perform an integrity check on the CRC parity bit using the CS-RNTI in a CRC check process.

The UE interprets the DCI through a known DCI format with respect to the DCI whose integrity has been identified.

The configuration (whether a detailed field has been changed, a size and interpretation) of a DCI format or the DCI format itself may be determined based on an RRC parameter associated with corresponding DCI.

Meanwhile, non-fallback DCI may have many portions changed by an RRC parameter compared to fallback DCI.

DCI for DL SPS or configured grant transmission, in other words, the usage of DCI scrambled by a CS-RNTI may be as follows.

Usage 1: an activation and release message for the configuration of DL SPS or a configured grant Usage 2: DCI for the retransmission of a TB first transmitted by DL SPS or a configured grant The activation or release message is DCI for resource allocation and release for DL SPS or a configured grant.

For the interpretation of corresponding DCI, a UE uses an RRC configuration associated with DL SPS or a configured grant.

In this case, in the case of DCI for retransmission, a base station may use one of the following two examples.

Example a-1

Example a-1 is an example in which the non-fallback DCI format of a CS-RNTI follows the configuration of SPS or a configured grant regardless of retransmission or activation/release.

That is, regardless of DCI usage, a DCI format or DCI configuration used for DCI scrambled by a CS-RNTI may be determined as SPS or a configured grant configuration.

If such an example is used, there is an effect in that a UE can always apply the same example in interpreting DCI transmitted using a CS-RNTI.

Example a-2

Example a-2 is an example in which the non-fallback DCI format of a CS-RNTI follows a configuration for the UL grant of a C-RNTI, for retransmission.

Activation/release may follow SPS or a configured grant configuration.

That is, a DCI format or DCI configuration used for the activation and/or release signaling of SPS or a configured grant is determined as a parameter of SPS or a configured grant configuration.

If corresponding DCI is used for the retransmission of SPS or a configured grant, however, a DCI format or DCI configuration used for normal transmission may be used.

In other words, if corresponding DCI is used for the retransmission of SPS or a configured grant, a DCI format or DCI configuration used for DCI scrambled by a C-RNTI may be used.

That is, a UE may identify whether DCI received from a base station is usage for activation/release or usage for retransmission, and may differently apply an RRC configuration, received from the base station, based on the identified usage.

Accordingly, the UE can perform the retransmission of SPS or a configured grant using the same example as normal transmission.

Furthermore, according to Example a-2, there is an effect in that a UE can perform more flexible scheduling using different SPS or configured grant transmission and retransmission techniques.

For example, resource allocation may be more flexible by applying different repetition transmission numbers to configured grant transmission and retransmission or applying different RA types.

If Example a-2 is used, DCI scrambled by a CS-RNTI may use two DCI formats or DCI configurations.

That is, DCI scrambled by a CS-RNTI may be used as a DCI format or configuration according to SPS or a configured grant configuration or may be used as a DCI format or configuration for retransmission.

More specifically, a DCI format or DCI configuration determined by SPS or a configured grant configuration may be used upon activation/release. A DCI format or DCI configuration used for DCI scrambled by a C-RNTI may be used for layer1 (L1) signaling for retransmission.

In this case, a UE may use a DCI format or DCI configuration determined by SPS or a configured grant configuration if validity is confirmed through the validation check of activation/release, and may use a DCI format or DCI configuration used for DCI scrambled by a C-RNTI if activation/release is invalid and/or is not a validation target.

In this case, the validation may be performed based on a specific field.

For example, if the NDI field of DCI has an NDI field value that is not toggled or has not been toggled, that is, if the NDI field is L1 signaling to be used for retransmission, a DCI format or DCI configuration used for DCI scrambled by a C-RNTI may be used.

A UE may interpret DCI, scrambled by a CS-RNTI, as DCI for special transmission when an NDI field value of the DCI is "0", and may interpret the DCI as DCI to be used for retransmission when the NDI field value is "1."

Specifically, when the NDI field value is "0", the UE may determine that the DCI is DCI to be used for the activation/release of SPS. When the NDI field value is "1", the UE may determine that the DCI is DCI for PUSCH retransmission.

That is, the UE may receive the DCI from a base station, and may identify the usage (whether the DCI is for activation DCI or for retransmission DCI) of the received DCI based on a specific field (e.g., NDI field).

In order to support such an operation, a DCI field used for activation and retransmission in common may need to be positioned at least in a fixed position.

The reason for this is that after unmasking based on a CS-RNTI, a UE should identify whether DCI is DCI for activation or DCI for retransmission by reading a specific field.

According to Example a-2, a UE receives DCI scrambled by a CS-RNTI, and identifies the usage of the DCI based on a specific field value included in the DCI.

Furthermore, the UE may determine an RRC parameter set to be applied based on the identified usage of the DCI, and may determine a DCI field configuration and DCI format based on the determined parameter set.

Furthermore, in order to identify activation and release, the following contents may need to be taken into consideration.

As shown in Tables 4 to 6, an HARQ process number, an RV, an MCS, and an NDI field may be used at least for activation/release.

Assuming that there is no release using non-fallback DCI, it is necessary to distinguish between activation DCI usage and retransmission DCI usage. To this end, there is a need for at least the field of an HARQ process number, RV, NDI, etc.

Table 4 is a table for a special field for DL SPS and UL grant type 2 scheduling activation PDCCH validation check.

TABLE 4

| | DCI format 0_0/0_1 | DCI format 1_0 | DCI format 1_1 |
| --- | --- | --- | --- |
| HARQ process number | set to all '0's | set to all '0's | set to all '0's |
| Redundancy version (RV) | set to '00' | set to '00' | For the enabled transport block: set to '00' |

According to Table 4, in each DCI format, the validation of active DCI may be determined based on an HARQ process number field and/or an RV field.

Table 5 is a table for a special field for DL SPS and UL grant type 2 scheduling release PDCCH validation check.

TABLE 5

| | DCI format 0_0/0_1 | DCI format 1_0 | DCI format 1_1 |
| --- | --- | --- | --- |
| HARQ process number | set to all '0's | set to all '0's | set to all '0's |
| Redundancy version (RV) | set to '00' | set to '00' | For the enabled transport block: set to '00' |
| Modulation and coding scheme (MCS) | set to all '1's | set to all '1's | set to all '1's |
| Resource block assignment | set to all '1's | set to all '1's | set to all '1's |

According to Table 5, in each DCI format, the validation of release DCI may be determined based on an HARQ process number field, an RV field, an MCS field and/or a resource block assignment field.

If there is an additionally necessary field in addition to the above-described field, it may be assumed that in the DCI format, common fields are positioned first and then different fields are positioned.

That is, the field order of the DCI format 0_1 may be changed like Table 6 and configured.

Table 6 is a table showing the order of field values and fields configuring the DCI format 0_1.

TABLE 6

Carrier indicator - 0 or 3 bits
UL/SUL indicator -
Identifier for DCI formats - 1 bit
Bandwidth part indicator - 0, 1 or 2 bits, bitwidth may be determined by $\lceil \log_2 (n_{BWP}) \rceil$ bits.
New data indicator - 1 bit
Redundancy version - 2 bits
HARQ process number - 4 bits
Frequency domain resource assignment - bit size is determined as follows, $N_{RB}^{UL, BWP}$ is the size of an active bandwidth part.
(a corresponding field is configured based on each configuration)
Time domain resource assignment
(it is assumed that a time domain RA for activation follows a grant-based configuration. That is, the same field is used)
VRB-to-PRB mapping - 0 or 1 bit
(present or not present depending on a CS and grant-based configuration)
Frequency hopping flag - 0 or 1 bit
(present or not present depending on a CS and grant-based configuration)
Modulation and coding scheme - 5 bits
1st downlink assignment index - 1 or 2 bits:
1 bit for semi-static HARQ-ACK codebook;
2 bits for dynamic HARQ-ACK codebook with single HARQ-ACK codebook.
2nd downlink assignment index - 0 or 2 bits
(present or not present depending on a CS and grant-based configuration)
2 bits for dynamic HARQ-ACK codebook with two HARQ-ACK sub-codebooks; 0 bit otherwise.
TPC command for scheduled PUSCH - 2 bits
SRS resource indicator
(follows a UL grant configuration if present)
Precoding information and number of layers
(a different configuration is possible depending on the configuration)
Antenna ports - a different configuration is possible depending on the number of bits determined by the following configuration)
SRS request
(follows a UL grant configuration)
CSI request
(not used for activation)
CBG transmission information (CBGTI)
(not used for activation)
PTRS-DMRS association
(a different configuration or follows a UL grant configuration)
beta_offset indicator
(not used for activation or selects a beta offset to be used for a CS)
DMRS sequence initialization
(activation or retransmission may be differently configured based on a CS and grant-based configuration)

According to Table 6, a field positioned ahead of a new data indicator (NDI) field may include a carrier indicator field, an UL/SUL indicator field, an identifier for DCI formats field, a bandwidth part indicator field.

As described above, the field positioned ahead of the NDI field may be assumed to be a common field.

If Example a-2 is used, a DCI format 0_1' (with CS-RNTI for activation) may be generated by configuring a field (configuring the field based on a CS configuration) necessary for activation DCI.

In this case, if the field sizes of a corresponding DCI format 0_1' and a DCI format 0_1 are different, a UE may take the following operation into consideration.

Padding may be performed on the DCI format 0_1' or the DCI format 0_1 as much as a required size based on maximum values of the DCI format 0_1' and the DCI format 0_1.

For example, the field of the DCI format 0_1' may be padded based on the field size of the DCI format 0_1. If the field size of the DCI format 0_1' is greater than the DCI format 0_1, the field of the DCI format 0_1' may be truncated.

It may be assumed that a (partial or total) DCI field cut off through truncation may use a default or may not use a default value.

A field used for activation DCI may assume a field shown in Table 7.

Table 7 is a table showing a DCI field for activation DCI.

TABLE 7

| Size | Field name | What makes activation larger? | Difference is up to | Used for activation DCI |
|---|---|---|---|---|
| 1, | Identifier for DCI formats | x | | Yes |
| 0, 3 | Carrier indicator | x | | Yes |
| 0, 1 | UL/SUL indicator | x | | Yes |
| 0-2 | Bandwidth part indicator | x | | Yes (if not used, move this field after RV/HARQ) |
| 1, | New data indicator | x | | Yes |
| 2, | Redundancy version | x | | Yes |
| 4, | HARQ process number | x | | Yes |
| x | Frequency domain resource assignment | RA type | 8 | Yes |
| 0-4 | Time domain resource assignment | x | | Yes |
| 0, 1 | Frequency hopping flag | RA type | 1 | Yes |
| 5, | Modulation and coding scheme | x | | Yes |
| 1, 2 | 1st downlink assignment index | x | | No |
| 0, 2, | 2nd downlink assignment index | x | | No |
| 2, | TPC command for scheduled PUSCH | x | | FFS |
| 1, 2, 3, 4 | SRS resource indicator | x | | Yes |
| 0-6 | Precoding information and number of layers | TP-disable | 2 | Yes |
| 2, 3, 4, 5 | Antenna ports | TP-disable, DMRS | 3 | Yes |
| 2, | SRS request | x | | FFS |
| 0-6 | CSI request | x | | No |
| 0, 2, 4, 6, 8 | CBG transmission information | x | | No |
| 0, 2 | PTRS-DMRS association | TP-disable, DMRS | 2 | Yes |
| 0, 2 | beta_offset indicator | beta offset config | 2 | Yes |
| 0, 1 | DMRS sequence initialization | tp-disable | 1 | Yes |

In the case of activation/release signaling using Example a-1 or Example a-2, the DCI field configuration of DCI scrambled by a CS-RNTI and the size of each field may be different from DCI scrambled by a C-RNTI due to a separated RRC configuration of SPS or a configured grant, an RRC parameter.

In other words, a different DCI field interpretation technique or a different DCI format may be used.

If total sizes of DCI scrambled by a CS-RNTI and DCI scrambled by a C-RNTI are different, there is a problem in that the complexity of PDCCH blind decoding that needs to be performed by a UE is increased.

In order to solve such a problem, the following examples may be taken into consideration in order to make identical a total size of DCI, configured through the configuration of SPS or a configured grant, and a total size of normal DCI.

Example b-1

Example b-1 is an example of configuring the configuration of SPS or a configured grant so that it always has the same configuration as normal DCI.

That is, although a UE receives DCI configured through the configuration of a configured grant, it may recognize and interpret the DCI as DCI for normal (e.g., PUSCH transmission).

Example b-2

Example b-2 is an example capable of performing zero bit padding based on the format of DCI or the configuration of DCI having a larger total size of DCI, among two DCI formats or DCI configurations, in DCI scrambled by a CS-RNTI and DCI scrambled by a C-RNTI.

In this case, the zero bit padding may be performed until the two DCI sizes become the same.

Example b-3

Example b-3 is an example in which DCI scrambled by a CS-RNTI uses the same field configuration and field size as DCI scrambled by a C-RNTI.

That is, an RRC configuration received from a base station may be differently applied to DCI, received from the base station (DCI scrambled by a CS-RNTI), depending on the usage of the DCI.

In other words, in DCI scrambled by a CS-RNTI, a field not present in DCI scrambled by a C-RNTI may be omitted. Zero bit padding or truncation may be performed on the most significant bit (MSB) or least significant bit (LSB) of a present field so that the present field has the same size as the field of the DCI scrambled by the C-RNTI.

For example, there may be a specific field present in both DCI scrambled by a CS-RNTI and DCI scrambled by a C-RNTI.

In this case, if the bit size of the specific field is 11 bits in the DCI scrambled by the CS-RNTI and is 13 bits in the DCI scrambled by the C-RNTI, zero bit padding may be additionally performed as much as short 2 bits.

The zero bit padding may be considered to insert 0 as a bit within the DCI field.

In the opposite case, if the bit size of the specific field is 13 bits in the DCI scrambled by the CS-RNTI and 11 bits in the DCI scrambled by the C-RNTI, 2 bits of the 13 bits may be truncated.

In this case, the 2 bits that is zero bit padded or truncated may be the MSB or LSB within the specific field.

In other words, if a specific field size of DCI scrambled by a CS-RNTI is smaller by comparing the specific field size of the DCI scrambled by the CS-RNTI with a specific field size of DCI scrambled by a C-RNTI, zero bit padding may be performed. If the specific field size of the DCI scrambled by the CS-RNTI is larger, truncation may be performed.

A field value of an omitted field may be assumed to be 0 or may be assumed to be a separate default value. A part ahead of or behind the bit of a truncated field may be considered to be interpreted, assuming that the front or rear part has been filled with 0 or 1.

This may be understood that the same example applied to dynamic BWP switching is applied to the two different DCI formats.

Example b-4

Example b-4 is an example using the same size as that of a DCI format 0_1 for a grant if the DCI format 0_1 is configured.

For example, if the field size of CS-RNTI-based activation DCI (Example a-2) or activation and/or retransmission DCI (Example a-1) is greater than the field of a pre-configured DCI format 0_1, the field size may be made identical by truncating fields form the rear.

In this case, it may be assumed that a partially or fully truncated field may use a default value or is not present.

When taking into consideration that transmission through DCI scrambled by a C-RNTI is common and frequently occurs compared to transmission through DCI scrambled by a CS-RNTI, a side effect for the DCI scrambled by the C-RNTI needs to be minimized.

If Example a-2 is used, a UE uses a DCI format or DCI configuration configured through the configuration of SPS or a configured grant only upon activation/release.

Accordingly, if a total size of the DCI format or DCI configuration of DCI scrambled by a CS-RNTI is made equal to or smaller than a total size of DCI scrambled by a C-RNTI and corresponding scheduling restriction is minimized, activation/release may be effectively performed without a side effect compared to Example b-2.

In this case, a DCI format or DCI configuration configured through the configuration of SPS or a configured grant can be designed through a technique described later.

Example c-1

Example c-1 is an example of making part of a DCI format or DCI configuration, configured through the configuration of SPS or a configured grant, identical with DCI scrambled by a C-RNTI in order to perform the validation of activation/release.

For example, the bit area of a DCI field (e.g., the field of an NDI, an HPN, an MCS, an RV, RB allocation, etc.) used for validation may have the same location and same size as the field of DCI scrambled by a C-RNTI within DCI.

Accordingly, a UE may determine a DCI format and DCI configuration through the validation of activation/release between the two DCI.

Example c-2

Meanwhile, if the usage of DCI is identified based on only an NDI field, the location and size of the NDI field may be the same between two DCI formats and configurations.

In other words, a total sum of the bits of fields positioned ahead of the NDI field of a DCI format or DCI configuration configured through the configuration of SPS or a configured grant may be the same as a total sum of fields positioned ahead of the NDI field of the DCI format or DCI configuration of DCI scrambled by a C-RNTI.

Alternatively, to this end, the NDI field may be first positioned compared to a frequency domain resource assignment field.

For example, DCI may be configured in order of an identifier for DCI formats field, a carrier indicator field, an UL/SUL indicator field, a bandwidth part indicator field, and a new data indicator field.

Example c-3

Example c-3 is an example of using a DCI format or DCI configuration configured with only an essential field by omitting fields used for retransmission in order for the DCI format or DCI configuration to have a smaller size, if the DCI format or DCI configuration configured through the configuration of SPS or a configured grant is used for only activation/release.

For example, a DCI configuration from which a DAI field, a TPC field, an SRS RI field, an SRS request field, a CSI request field and/or a CBG-TI field have been omitted may be used.

Alternatively, a DCI format or DCI configuration configured with only fields used for activation of Table 7 may be used.

Example c-4

Example c-4 is an example in which a UE assumes that a DCI format or DCI configuration configured through the configuration of SPS or a configured grant is always smaller than the size of DCI scrambled by a C-RNTI.

In other words, when a DCI configuration in which the configuration of SPS or a configured grant has been taken into consideration is greater than the size of DCI scrambled by a C-RNTI, the configuration of the SPS or configured grant is assumed to be an invalid configuration.

That is, a UE does not assume that the size of DCI scrambled through a CS-RNTI, transmitted through a base station, is greater than the size of DCI scrambled by a C-RNTI. If the field size of the DCI received from the base station is greater than the field size of the DCI scrambled by the C-RNTI, the UE may determine that the received DCI is invalid.

Example c-5

Example c-5 is an example in which a base station may truncate the entire DCI when the size of a DCI format or DCI configuration configured through the configuration of SPS or a configured grant is greater than the size of DCI scrambled by a C-RNTI.

For example, a DCI field may be omitted or truncated from a field located behind.

In this case, a UE may interpret a DCI field that has been fully or partially omitted, assuming that a part ahead of or behind a bit has been filled with 0 or 1.

Example c-6

Priority according to a specific criterion may be present between fields.

For example, the size of a DCI format or DCI configuration configured through the configuration of SPS or a configured grant may be greater than the size of DCI scrambled by a C-RNTI.

In this case, a UE may assume that a DCI field has been omitted or truncated from a field having lower priority.

In this case, the UE may interpret a DCI field that has been fully or partially omitted, assuming that a part ahead of or behind a bit has been filled with 0 or 1.

Furthermore, Example b-3 (zero bit padding or truncation) may be used up to a field positioned at the end, among fields included in an NDI field or validation point for Examples c-1 and c-2.

Handling of Fallback DCI Scrambled by CS-RNTI

If a fallback DCI format is used for SPS or a configured grant, the field configuration is always the same as that of fallback DCI scrambled by a C-RNTI because the field configuration is not possible.

Accordingly, as described above, problems in that ambiguity and the complexity of blind decoding occurring because the field configuration and the DCI size are different can be solved.

In order to use fallback DCI scrambled by a CS-RNTI as the L1 signaling of the configuration of SPS or a configured grant, the following contents may be additionally taken into consideration.

Example d-1

Example d-1 is an example in which the fallback DCI of a CS-RNTI follows the configuration of SPS or a configured grant regardless of retransmission or activation/release.

In other words, if fallback DCI scrambled by a CS-RNTI is used regardless of the usage of DCI, a transmission parameter, such as a waveform, may be determined based on the configuration of SPS or a configured grant.

Furthermore, if Example d-1 is used, a UE may always apply the same example in interpreting DCI transmitted using a CS-RNTI.

Example d-2

Example d-2 is an example in which the fallback DCI of a CS-RNTI follows the configuration of the UL grant of a C-RNTI for retransmission and activation/release follows the configuration of SPS or a configured grant.

If fallback DCI scrambled by a CS-RNTI is used for retransmission regardless of the configuration of SPS or a configured grant, a transmission parameter, such as a waveform, may use the same DCI as DCI scrambled by a C-RNTI (e.g., a waveform for Msg3).

If fallback DCI scrambled by a CS-RNTI is used for activation/release, a transmission parameter, such as a waveform, may follow the configuration of SPS or a configured grant.

Example d-3

Example d-3 is an example in which the fallback DCI of a CS-RNTI format follows the configuration of a C-RNTI regardless of retransmission or activation/release.

In other words, if fallback DCI scrambled by a CS-RNTI is used regardless of the usage of DCI, a transmission parameter, such as a waveform, may have the same DCI as DCI scrambled by a C-RNTI (e.g., a waveform for Msg3)

A UE can always apply the same example to the interpretation of DCI, transmitted using fallback DCI, by using Example d-3.

Furthermore, since a base station selects a DCI format, the transmission parameter (e.g., a waveform, a DMRS, and an RA type) of a configured grant which may be allocated to a UE can be configured in more various ways.

If fallback DCI follows an SPS and/or grant-free configuration, unlike in non-fallback DCI, some DCI field, such as an RS parameter (e.g., DMRS port value), may not be present in the fallback DCI.

The following problems may occur because some DCI fields are not present.

Other configurations, such as a waveform (i.e., transform precoder), follow a value configured in SPS and/or a configured grant, but a preconfigured value used in fallback DCI may not be applied depending on a value used in an SPS and/or grant-free configuration.

For example, if DFT-s-OFDM is configured in fallback DCI, a DMRS value of CP-OFDM used in a grant-free configuration may not be applied.

Furthermore, although a configuration does not follow the configuration of SPS and/or a configured grant, if the configuration of fallback DCI is used, there may be a problem in that the configuration of a DMRS for UE multiplexing, contention-based is not flexible.

In order to solve such a problem, the following may be taken into consideration.

Example e-1

Example e-1 is an example of assuming that corresponding DCI is valid only when the waveform (or a waveform of Msg.3) and/or RA type of fallback DCI and the waveform and/or RA type of an SPS and/or grant-free configuration are the same if the fallback DCI follows the SPS and/or grant-free configuration.

Example e-2

Example e-2 is an example of interpreting DCI when the waveform (or waveform of Msg.3) and/or RA type of fallback DCI and the waveform and/or RA type of an SPS and/or grant-free configuration are different if the fallback DCI follows the SPS and/or grant-free configuration.

That is, since the waveform and/or RA type of fallback DCI following an SPS and/or grant-free configuration are different from the waveform and/or RA type of SPS and/or grant-free configuration, the same interpretation is impossible or DCI may be interpreted using a corresponding field value as 0 or 1 or using a pre-configured value with respect to a DCI field that is not present.

Example e-2-1

Example e-2-1 is an example capable of interpreting a field to which the application of Example e-2 is impossible, assuming that a DCI field following an SPS and/or grant-free configuration has been truncated and/or zero padded.

In other words, in the interpretation of fallback DCI, the same interpretation as that of BWP switching DCI may be assumed.

Example e-2-2

Example e-2-2 is an example of interpreting an RB allocation field based on the RA type of fallback DCI regardless of the RA type of an SPS and/or grant-free configuration.

Accordingly, ambiguity in fallback DCI reception can be solved.

Example e-3

Example e-3 is an example capable of applying different interpretation only when some fields of fallback DCI are associated with an SPS and/or grant-free configuration in order to solve the ambiguity of the configuration of fallback DCI and an SPS and/or grant-free configuration and to make a configuration more flexible.

In other words, if fallback DCI is scrambled by a CS-RNTI or used for activation/release, interpretation different from that of the fallback DCI of a C-RNTI may be used.

For example, the TPC, RV and/or DAI field of the existing fallback DCI may be interpreted as one of other DCI fields (e.g., a relDMRS/MIMO-related field) or may be interpreted as indicating the index of a table which may define a different parameter set (e.g., a DMRS/MIMO-related parameter set).

In other words, if fallback DCI is scrambled by a CS-RNTI or used for activation/release, it may be interpreted that a different parameter (e.g., a DMRS/MIMO-related DCI field) is present instead of the TPC, RV and/or DAI field.

Example e-4

In order to solve the ambiguity of the configuration of fallback DCI and an SPS and/or grant-free configuration, a configuration to be used by fallback DCI or a default value may include the two cases of CP-OFDM and DFT-s-OFM.

For example, a parameter, such as a waveform to be used by Msg.3 according to fallback DCI, an RAR grant, may be determined or may have been predetermined through higher layer signaling, such as an RMSI, or through L1 signaling.

In this case, a configuration to be used by fallback DCI or a predetermined value may be used by taking into consideration all cases which may be used for the fallback DCI.

Specifically, a default value for both cases when CP-OFDM, DFT-s-OFM, in other words, a transform precoder is present or not present may be determined through higher layer signaling.

For example, by taking into consideration that Msg.3 uses only DFT-s-OFDM and fallback DCI uses DFT-s-OFDM, but the fallback DCI may be used for an SPS and/or grant-free configuration, both CP-OFDM and DFT-s-OFDM may be configured if Msg.3 is associated with a DMRS which may be used by the fallback DCI.

In this case, if a predetermined value is used, a value which may be used as much as possible in all cases where the predetermined value can be used for fallback DCI not the first value simply may be selected as the predetermined value.

For example, if two waveforms (transform precoders) or RA type, etc. can be used for fallback DCI, a maximum length may be assumed to be 1 (maxLength is 1), a DMRS port may be assumed to be 0, and the number of DMRS CDM groups without data may be assumed to be 2.

That is, a value which may be used regardless of a waveform is preferentially selected.

Handling DCI Scrambled by CS-RNTI with BWP Switching

In a next-generation system, a frequency domain used by a UE may be adjusted through a bandwidth part (BWP).

Such adjustment of the frequency domain may influence a resource allocation technique of a frequency resource allocated to a UE by a base station.

In other words, a change in the BWP may influence a change in the DCI configuration.

In order to make dynamic such a change in the BWP, it is necessary to perform resource allocation to a target BWP and a BWP change at the same time by making different interpretation without a change in the DCI configuration.

To this end, when DCI scrambled by a CS-RNTI for SPS and/or a configured grant configuration configured in an inactive BWP is received in an active BWP, there is a need for a technique for making the corresponding DCI have the same size as DCI scrambled by the C-RNTI of the active BWP. Accordingly, the following examples may be taken into consideration.

Example f-1

DCI scrambled by the CS-RNTI of an inactive BWP may be matched to have the same size as DCI scrambled by the C-RNTI of the inactive BWP.

In order for DCI scrambled by the CS-RNTI of an inactive BWP to have the same size as DCI scrambled by the C-RNTI of the inactive BWP, Example a to Example c may be used or an example used upon DCI size matching in dynamic BWP switching may be applied.

Such an example enables the configuration of DCI scrambled by a CS-RNTI to be designed based on DCI scrambled by a C-RNTI without taking BWP switching into consideration.

Example f-1-1

DCI scrambled by a CS-RNTI, matched according to Example f-1, may be matched with DCI scrambled by the C-RNTI of an active BWP.

To this end, Example a to Example c may be used or an example used upon DCI size matching in dynamic BWP switching may be applied.

Example f-1-2

DCI scrambled by a CS-RNTI matched according to Example f-1 may be matched with DCI scrambled by the CS-RNTI of an active BWP.

To this end, Example a to Example c may be used or an example used upon DCI size matching in dynamic BWP switching may be used.

In this case, there is an effect in that scheduling restriction can be reduced when the configuration of DCI scrambled by the CS-RNTI of an active BWPs and the configuration of DCI scrambled by the C-RNTI of the active BWP are different.

Example f-2

DCI scrambled by the CS-RNTI of an inactive BWP may be matched to have the same size as DCI scrambled by the C-RNTI of an active BWP.

To this end, Example a to Example c may be used or an example used upon DCI size matching in dynamic BWP switching may be used.

In this case, there is an effect in that scheduling restriction attributable to DCI size matching can be reduced.

Example f-3

DCI scrambled by the CS-RNTI of an inactive BWP may be matched to have the same size as DCI scrambled by the CS-RNTI of an active BWP.

To this end, Example a to Example c may be used or an example used upon DCI size matching in dynamic BWP switching may be used.

In this case, there is an effect in that scheduling restriction can be reduced if the configuration of DCI scrambled by the CS-RNTI of an active BWP and the configuration of DCI scrambled by the C-RNTI of the active BWP are different.

The DCI scrambled by the CS-RNTI may mean DCI scrambled by a CS-RNTI for activation/release and/or DCI scrambled by a CS-RNTI for retransmission.

Particularly, different techniques may be used depending on the usage of DCI scrambled by the CS-RNTI of an inactive BWP.

That is, Example f-1-1 or f-1-2 may be used for DCI scrambled by a CS-RNTI for the retransmission of an inactive BWP, and Example f-2 or f-3 may be used for DCI scrambled by a CS-RNTI for the activation/release of an inactive BWP.

This may be easily applied when the configuration of DCI scrambled by a CS-RNTI for retransmission is the same as the configuration of DCI scrambled by a C-RNTI.

As another example, it may be assumed that BWP switching and CS-RNTI activation may be triggered at the same time, but BWP switching and CS-RNTI retransmission do not occur at the same time. In addition, it may be assumed that a C-RNTI configuration is always followed upon CS-RNTI retransmission.

In such a case, when BWP switching is triggered upon activation, a DCI field may be configured as follows. This is similar to the above-described examples and may show an example of the above-described examples.

(1) In a 1 bit field, a technique of configuring CS-RNTI activation DCI may be configured based on a new active BWP.

That is, the type 2 configuration configures activation DCI according to a technique configured in a new BWP, and truncation may be performed, if necessary.

This may be determined according to Example a-2.

Furthermore, a total DCI size is configured based on the C-RNTI of a current BWP, but a DCI field may be configured based on the CS-RNTI configuration of a new BWP.

This may also be used for a retransmission CS-RNTI, if necessary.

In other words, in the DCI size, the format 0_1 is determined based on the C-RNTI of the current BWP. Each field size within DCI is configured based on the CS configuration of the new BWP.

(2) A bit field may be configured according to the technique (Example a-2) of configuring the CS-RNTI activation DCI of a current active BWP.

In this case, after the size of each field is configured based on a CS-RNTI within a current BWP by taking into consideration a case where the current BWP and a new BWP have different configurations, padding and/or truncation may be performed if necessary upon performing a different configuration for each field.

In addition, this may also be used for a retransmission CS-RNTI.

In other words, a DCI size is configured based on a current BWP on the basis of a C-RNTI. Each DCI field may be configured based on the CS configuration of a current BWP.

That is, this is a technique of matching DCI fields by performing padding/truncation, if necessary, based on the CS configurations of a current BWP and a new BWP for each DCI field.

If the above-described examples are used, a UE may assume the size of each DCI or DCI field identically although DCI is configured by a different RRC parameter in receiving the DCI for SPS or a configured grant.

Furthermore, the UE may determine a configuration associated with DCI received by the UE when the UE receives the DCI.

The above-described implementations may be implemented separately or a combination of one or more implementations may be implemented.

Figure 9:
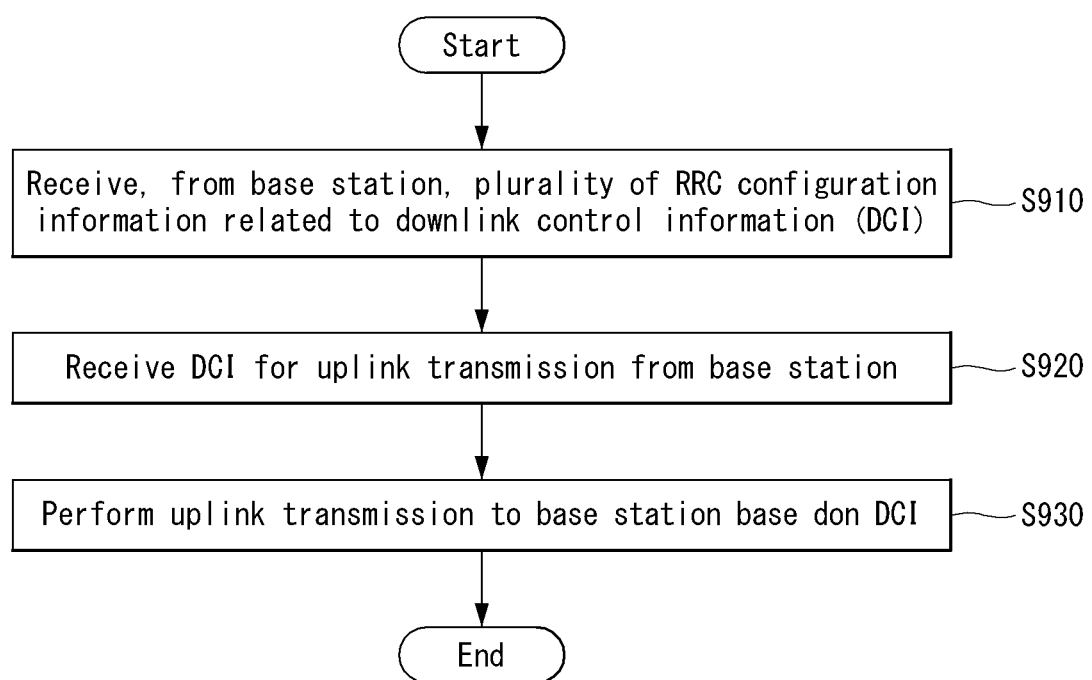
FIG. 9 is a flowchart showing an example of a terminal transmitting the uplink, which is described in this disclosure.

FIG. 9 is a flowchart showing an example of a UE transmitting the uplink, which is described in this disclosure.

That is, FIG. 9 shows an operating method of a UE performing a method of transmitting the uplink in a wireless communication system.

First, the UE receives, from a base station, a plurality of RRC configuration information related to downlink control information (DCI) (S910).

Furthermore, the UE receives DCI for uplink transmission from the base station (S920).

In this case, the parameters of specific RRC configuration information of the plurality of RRC configuration information may be applied to the DCI based on the usage of the DCI.

Thereafter, the UE performs uplink transmission to the base station based on the DCI (S930).

In this case, the DCI may include a field for identifying the usage of the DCI.

In this case, when the field size of the DCI is smaller than the field size of DCI for PUSCH transmission, the field of the DCI may be zero bit padded and decoded.

In this case, the DCI is DCI scrambled by a CS-RNTI, and the DCI for the PUSCH transmission is DCI scrambled by a C-RNTI.

In this case, a specific field for identifying the usage of the DCI may be any one of a 'new data indicator (NDI)' field, a 'redundancy version (RV)' field and/or an 'HARQ process number' field.

In this case, the zero bit padding may mean that 0 is inserted as a bit within each field until the field size of the DCI becomes the same size as the field size of the DCI for the PUSCH transmission.

Furthermore, the zero bit padding may mean that 0 is inserted as the most significant bit (MSB) or the least significant bit (LSB) within the field of the DCI.

Furthermore, the specific field for identifying the usage of the DCI may be positioned after a common field that is configured regardless of the usage of DCI.

Furthermore, when the field size of the DCI is greater than the field of the DCI for the PUSCH transmission, the DCI may be invalid DCI.

Contents in which transmitting uplink, described in this disclosure, is implemented in a UE device are described with reference to FIGS. 11 and 12.

A UE transmitting uplink in a wireless communication system may include a radio frequency (RF) module configured to transmit and receive radio signals; and a processor functionally connected to the RF module.

First, the processor of the UE controls the RF module to receive, from a base station, a plurality of RRC configuration information related to downlink control information (DCI).

Furthermore, the processor controls the RF module to receive DCI for uplink transmission from the base station.

In this case, the parameters of specific RRC configuration information of the plurality of RRC configuration information may be applied to the DCI based on the usage of the DCI.

Furthermore, the processor controls the RF module to perform uplink transmission to the base station based on the DCI.

In this case, the DCI may include a field for identifying the usage of the DCI.

In this case, when the field size of the DCI is smaller than the field size of DCI for PUSCH transmission, the field of the DCI may be zero bit padded and decoded.

In this case, the DCI is DCI scrambled by a CS-RNTI, and the DCI for the PUSCH transmission is DCI scrambled by a C-RNTI.

In this case, a specific field for identifying the usage of the DCI may be any one of a 'new data indicator (NDI)' field, a 'redundancy version (RV)' field and/or an 'HARQ process number' field.

In this case, the zero bit padding may mean that 0 is inserted into a bit within each field until the field size of the DCI becomes the same size as the field size of the DCI for the PUSCH transmission.

Furthermore, the zero bit padding may mean that 0 is inserted as the most significant bit (MSB) or the least significant bit (LSB) within the field of the DCI.

Furthermore, the specific field for identifying the usage of the DCI may be positioned after a common field that is configured regardless of the usage of DCI.

Furthermore, when the field size of the DCI is greater than the field of the DCI for the PUSCH transmission, the DCI may be invalid DCI.

Figure 10:
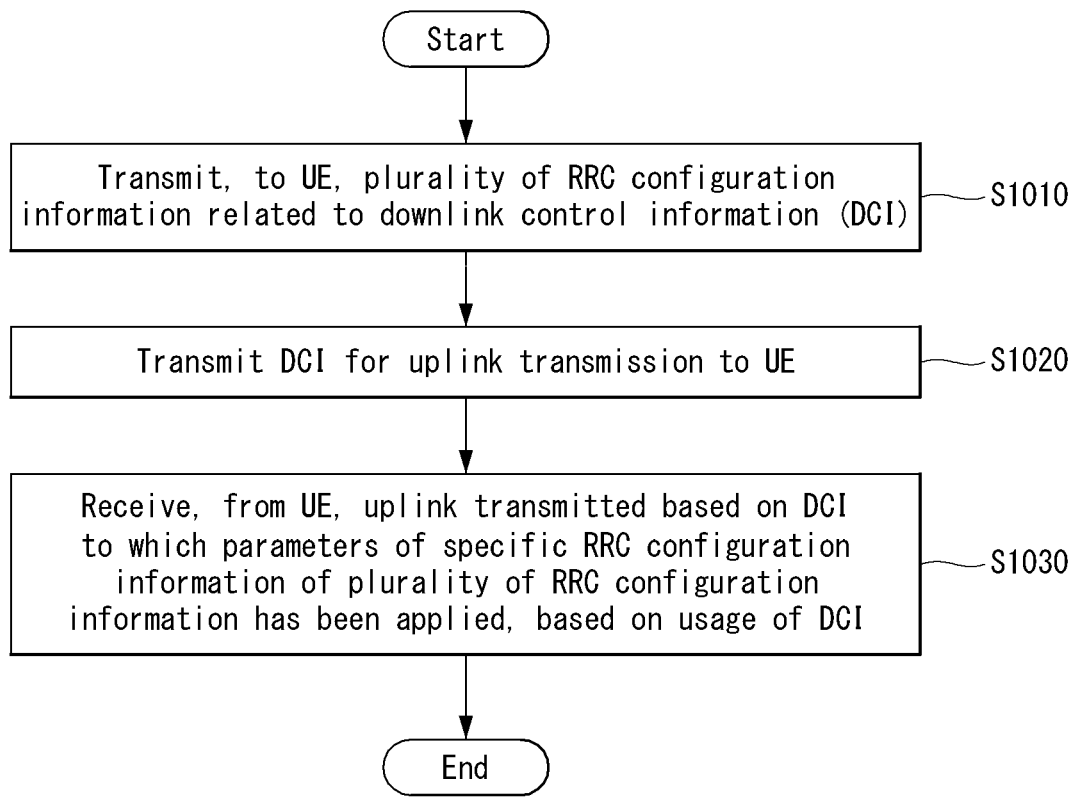
FIG. 10 is a flowchart showing an example of a base station receiving the uplink, which is described in this disclosure.

FIG. 10 is a flowchart showing an example of a base station receiving the uplink, which is described in this disclosure.

That is, FIG. 10 shows an operating method of a base station receiving system uplink from a UE in a wireless communication system.

First, the base station transmits, to the UE, a plurality of RRC configuration information related to downlink control information (DCI) (S1010).

Furthermore, the base station transmits DCI for uplink transmission to the UE (S1020).

Furthermore, the base station receives, from the UE, uplink transmitted based on DCI to which parameters of specific RRC configuration information of the plurality of RRC configuration information has been applied, based on the usage of the DCI (S1030).

In this case, the DCI may include a field for identifying the usage of the DCI.

In this case, when the field size of the DCI is smaller than the field size of DCI for PUSCH transmission, the field of the DCI may be zero bit padded.

Contents in which an operation of receiving uplink from a UE in a wireless communication system, described in this disclosure, is implemented in a base station device are described with reference to FIGS. 11 and 12.

A base station receiving uplink in a wireless communication system may include a radio frequency (RF) module configured to transmit and receive radio signals; and a processor functionally connected to the RF module.

First, the processor of the base station controls the RF module to transmit, to a UE, a plurality of RRC configuration information related to downlink control information (DCI).

Furthermore, the processor controls the RF module to transmit DCI for uplink transmission to the UE.

Furthermore, the processor controls the RF module to receive, from the UE, uplink transmitted based on DCI to which parameters of specific RRC configuration information of the plurality of RRC configuration information has been applied based on the usage of the DCI.

In this case, the DCI may include a field for identifying the usage of the DCI.

In this case, when the field size of the DCI is smaller than the field size of DCI for PUSCH transmission, the field of the DCI may be zero bit padded.

General Device to which the Present Disclosure May be Applied

Hereinafter, a device to which the present disclosure may be applied is described.

Figure 11:
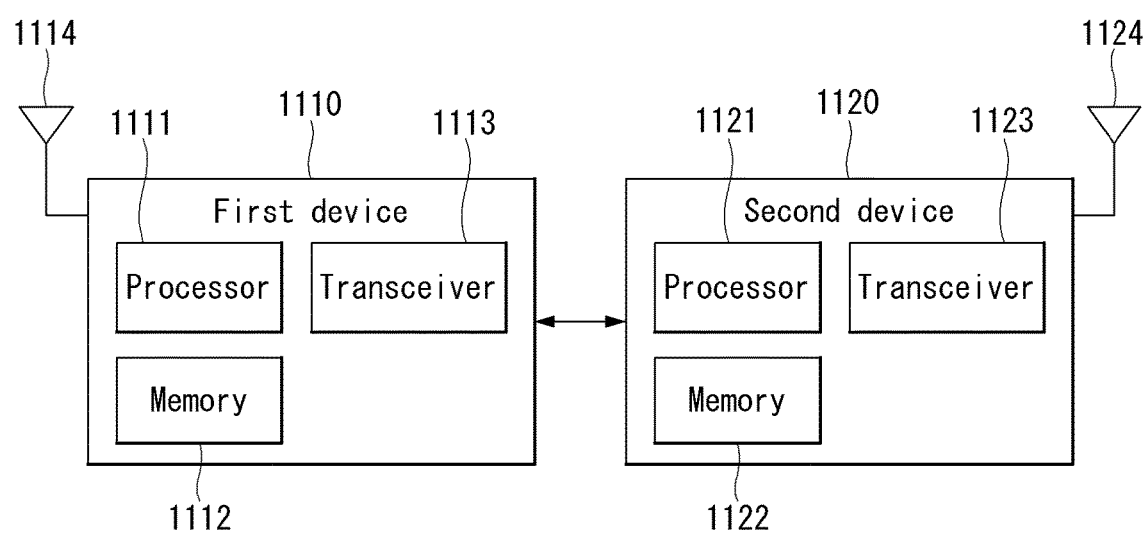
FIG. 11 illustrates a block diagram showing an example of a wireless communication device to which implementations described in this disclosure may be applied.

FIG. 11 illustrates a block diagram of an example of a wireless communication device to which examples described in this disclosure may be applied.

Referring to FIG. 11, a wireless communication system may include a first device 1110 and a second device 1120.

The first device 1110 may be a device related to a base station, a network node, a transmission user equipment (UE), a reception UE, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 1120 may be a device related to a base station, a network node, a transmission UE, a reception UE, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the UE may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 1110 may include at least one processor such as a processor 1111, at least one piece of memory such as memory 1112, and at least one transceiver such as a transceiver 1113. The processor 1111 may perform the above-described functions, procedures, and/or methods. The processor 1111 may perform one or more protocols. For example, the processor 1111 may perform one or more layers of a radio interface protocol. The memory 1112 is connected to the processor 1111, and may store various forms of information and/or instructions. The transceiver 1113 is connected to the processor 1111, and may be controlled to transmit and receive radio signals.

The second device 1120 may include at least one processor such as a processor 1121, at least one piece of memory such as memory 1122, and at least one transceiver such as a transceiver 1123. The processor 1121 may perform the above-described functions, procedures and/or methods. The processor 1121 may implement one or more protocols. For example, the processor 1121 may implement one or more layers of a radio interface protocol. The memory 1122 is connected to the processor 1121, and may store various forms of information and/or instructions. The transceiver 1123 is connected to the processor 1121 and may be controlled transmit and receive radio signals.

The memory 1112 and/or the memory 1122 may be connected inside or outside the processor 1111 and/or the processor 1121, respectively, and may be connected to another processor through various technologies, such as a wired or wireless connection.

The first device 1110 and/or the second device 1120 may have one or more antennas. For example, the antenna 1114 and/or the antenna 1124 may be configured to transmit and receive radio signals.

Figure 12:
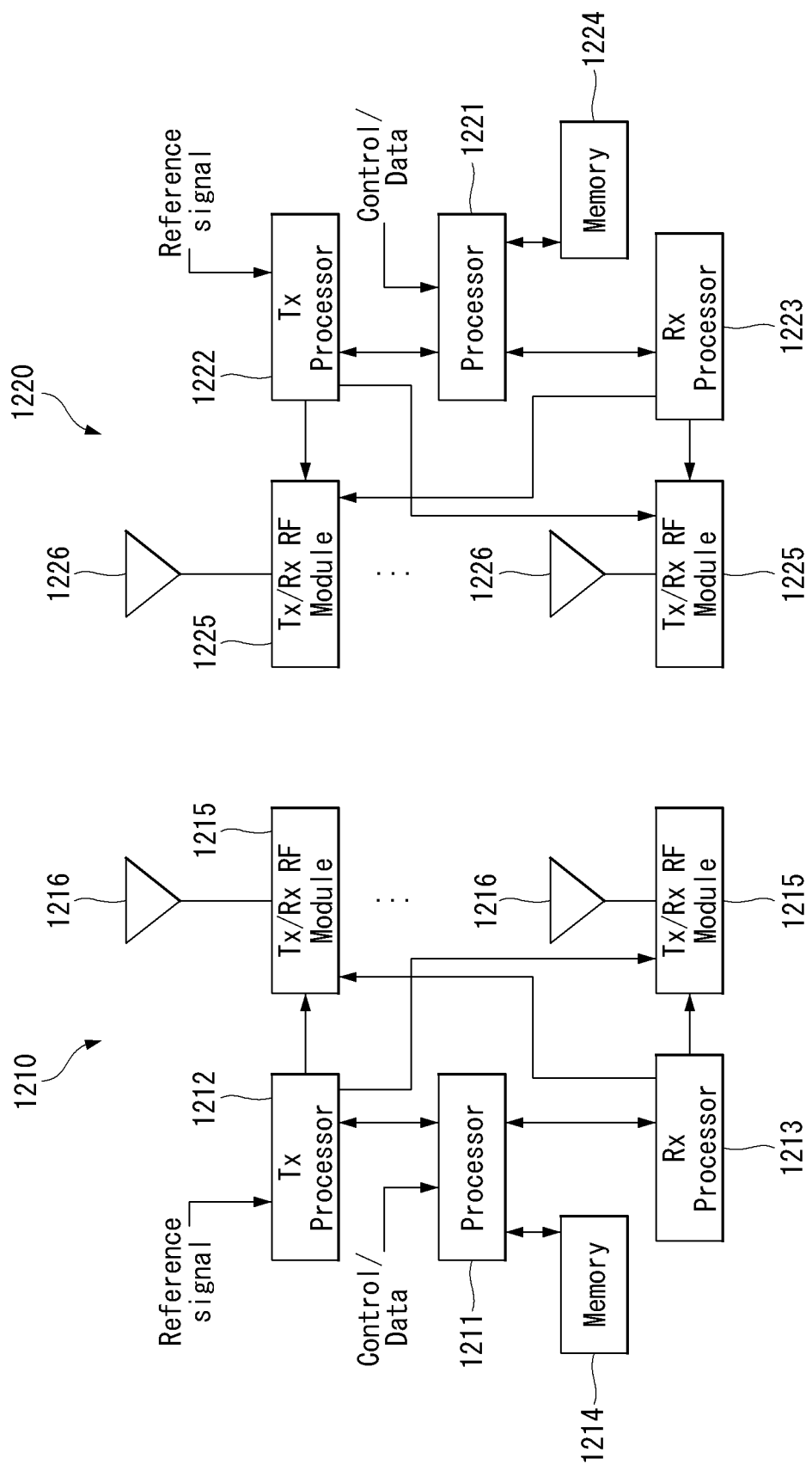
FIG. 12 is another example of a block diagram of a wireless communication device to which implementations described in this disclosure may be applied.

FIG. 12 illustrates another example of a block configuration diagram of a wireless communication device to which examples described by the present disclosure are applicable.

Referring to FIG. 12, a wireless communication system includes a base station 1210 and multiple UEs 1220 positioned in a region of the base station. The base station 1210 may be represented by a transmitter, and the UE 1220 may be represented by a receiver, or vice versa. The base station 1210 and the UE 1220 respectively include processors 1211 and 1221, memories 1214 and 1224, one or more Tx/Rx RF modules 1215 and 1225, Tx processors 1212 and 1222, Rx processors 1213 and 1223, and antennas 1216 and 1226. The processors implement functions, processes, and/or methods mentioned above. More specifically, in DL (communication from the base station to the UE), an upper layer packet from a core network is provided to the processor 1211. The processor implements functionality of the L2 layer. In the DL, the processor provides multiplexing between a logical channel and a transport channel and radio resource allocation to the UE 1220 and is also responsible for signaling to the UE 1220. The transmit (Tx) processor 1212 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 1216 via a separate Tx/Rx module (or transceiver 1215). Each Tx/Rx module may modulate an RF carrier with a respective spatial stream for transmission. At the UE, each Tx/Rx module (or transceiver 1225) receives a signal through the respective antenna 1226 of each Tx/Rx module. Each Tx/Rx module recovers information modulated onto an RF carrier and provides the information to the receive (Rx) processor 1223. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and deinterleaved to recover data and control signals that were originally transmitted by the base station on the physical channel. The corresponding data and control signals are provided to the processor 1221.

UL (communication from the UE to the base station) is processed at the base station 1210 in a manner similar to the description associated with a receiver function at the UE 1220. Each Tx/Rx module 1225 receives a signal through the respective antenna 1226. Each Tx/Rx module provides an RF carrier and information to the Rx processor 1223. The processor 1221 may be associated with the memory 1224 that stores a program code and data. The memory may be referred to as a computer readable medium.

The implementations described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement implementations of the present disclosure. The order of operations described in implementations of the present disclosure may be changed. Some components or features of one implementation may be included in another implementation, or may be replaced by corresponding components or features of another implementation. It will be apparent that some claims referring to specific claims may be combined with another claims referring to the other claims other than the specific claims to constitute the implementation or add new claims by means of amendment after the application is filed.

Implementations of the present disclosure can be implemented by various means, for example, hardware, firmware, software, or combinations thereof. When implementations are implemented by hardware, one implementation of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When implementations are implemented by firmware or software, one implementation of the present disclosure can be implemented by modules, procedures, functions, etc. performing functions or operations described above. Software code can be stored in a memory and can be driven by a processor. The memory is provided inside or outside the processor and can exchange data with the processor by various well-known means.

While the present disclosure has been described and illustrated herein with reference to the preferred implementations thereof, it will be apparent to those skilled in the art that various modifications and variations can be made therein without departing from the spirit and scope of the present disclosure. Thus, it is intended that the present disclosure covers the modifications and variations of this disclosure that come within the scope of the appended claims and their equivalents.

Implementations are disclosed herein for performing uplink communication in a wireless communication system.

In some scenarios, problems may arise when different configurations of the uplink communication cause a user equipment (UE) to receive different downlink control information (DCI) from a base station (BS). In such scenarios, difficulties in UE design and power consumption may arise because the differences in DCI information may result in increase of decoding complexity for the UE.

Implementations of this disclosure may resolve such difficulties by ensuring identical sizes of DCI or sizes of DCI fields, even in scenarios where the DCI is configured by a different RRC parameter.

For example, implementations are disclosed for interpreting a format and a field of downlink control information (DCI) by applying a different radio resource control (RRC) configuration based on a usage of the DCI.

As another example, implementations are disclosed for configuring a field size using zero bit padding or truncation in interpreting the field of the DCI based on the usage of the DCI.

Implementations disclosed here may have one or more effects. In some scenarios, implementations disclosed herein may have an effect that DCI interpretation is efficiently performed because DCI scrambled by a configured scheduling-RNTI (CS-RNTI) is classified based on its usage and a different configuration can be applied.

Furthermore, in some scenarios, implementations disclosed herein may have an effect that complexity upon DCI decoding is reduced by identically interpreting the field sizes of DCI configured with different parameters.

Effects of implementations in the present disclosure are not limited to the above-described effects, and other technical effects not described above may be evidently understood by a person having ordinary skill in the art to which the present disclosure pertains from the following description.

The present disclosure has been illustrated as being applied to the 3GPP LTE/LTE-A/NR system, but may be applied to various wireless communication systems in addition to the 3GPP LTE/LTE-A/NR system.

The invention claimed is:

1. A method of performing, by a user equipment (UE), uplink transmission in a wireless communication system, the method comprising:

receiving, from a base station (BS), first radio resource control (RRC) configuration information for a configured grant-based physical uplink shared channel (PUSCH);
receiving, from the BS, second RRC configuration information for a dynamic grant-based PUSCH;
receiving, from the BS, a first downlink control information (DCI) that is scrambled by a configured scheduling (CS)-radio network temporary identifier (RNTI);
validating the first DCI as a valid activation or a valid release of the configured grant-based PUSCH;
applying parameters of the first RRC configuration information to the first DCI, according to a DCI format of the first DCI, for a configured grant-based PUSCH transmission;
performing the configured grant-based PUSCH transmission to the BS;
receiving, from the BS, a second DCI that is scrambled by the CS-RNTI; and
based on a new data indicator (NDI) field of the second DCI indicating a PUSCH re-transmission: (i) applying parameters of the second RRC configuration information to the second DCI, according to the same DCI format as the first DCI, for the PUSCH re-transmission, and (ii) performing the PUSCH re-transmission to the BS,
wherein at least one field of the first DCI that is scrambled by the CS-RNTI comprises zero-padding to have a same size as each corresponding at least one field of a third DCI that is scrambled by a cell-RNTI (C-RNTI), wherein the third DCI has the same DCI format as the first DCI.

2. The method of claim 1,
wherein each of the first DCI and the second DCI that is scrambled by the CS-RNTI comprises a cyclic redundancy check (CRC) that is scrambled by the CS-RNTI, and
wherein the third DCI that is scrambled by the C-RNTI comprises a CRC that is scrambled by the C-RNTI.

3. The method of claim 1,
wherein validating the first DCI is performed based on one or more of a 'new data indicator (NDI)' field, a 'redundancy version (RV)' field, or an 'HARQ process number' field of the first DCI.

4. The method of claim 1,
wherein the zero-padding in the at least one field of the first DCI comprises at least one 0 that is inserted into each of the at least one field of the first DCI so that the field of the first DCI has a same size as a corresponding field of the third DCI.

5. The method of claim 1,
wherein the zero-padding in the at least one field of the first DCI comprises at least one 0 that is inserted into a most significant bit (MSB) position within each of the at least one field of the first DCI.

6. The method of claim 1,
wherein validating the first DCI is performed based on one or more specific fields of the first DCI that identify a usage of the first DCI, wherein the one or more specific fields of the first DCI are positioned after a common field of the first DCI that is configured regardless of the usage of the first DCI.

7. A user equipment (UE) configured to perform uplink transmission in a wireless communication system, the UE comprising:

a transceiver;
at least one processor; and
at least one computer memory operably connectable to the at least one processor and storing instructions that, when executed by the at least one processor, perform operations comprising:
receiving, from a base station (BS) through the transceiver, first radio resource control (RRC) configuration information for a configured grant-based physical uplink shared channel (PUSCH);
receiving, from the BS through the transceiver, second RRC configuration information for a dynamic grant-based PUSCH;
receiving, from the BS through the transceiver, a first DCI that is scrambled by a configured scheduling (CS)-radio network temporary identifier (RNTI);
validating the first DCI as a valid activation or a valid release of the configured grant-based PUSCH;
applying parameters of the first RRC configuration information to the first DCI, according to a DCI format of the first DCI, for a configured grant-based PUSCH transmission;
performing the configured grant-based PUSCH transmission to the BS through the transceiver;
receiving, from the BS through the transceiver, a second DCI that is scrambled by the CS-RNTI; and
based on a new data indicator (NDI) field of the second DCI indicating a PUSCH re-transmission: (i) applying parameters of the second RRC configuration information to the second DCI, according to the same DCI format as the first DCI, for the PUSCH re-transmission, and (ii) performing the PUSCH re-transmission to the BS through the transceiver,
wherein at least one field of the first DCI that is scrambled by the CS-RNTI comprises zero-padding to have a same size as each corresponding at least one field of a third DCI that is scrambled by a cell-RNTI (C-RNTI), wherein the third DCI has the same DCI format as the first DCI.

8. The terminal UE of claim 7,
wherein each of the first DCI and the second DCI that is scrambled by the CS-RNTI comprises a cyclic redundancy check (CRC) that is scrambled by the CS-RNTI, and
wherein the second DCI that is scrambled by the C-RNTI comprises a CRC that is scrambled by the C-RNTI.

9. The UE of claim 7,
wherein validating the first DCI is performed based on one or more specific fields of the first DCI that identify a usage of the first DCI, wherein the one or more specific fields of the first DCI comprises at least one of a 'new data indicator (NDI)' field, a 'redundancy version (RV)' field, or an 'HARQ process number' field.

10. The UE terminal of claim 7,
wherein the zero-padding in the at least one field of the first DCI comprises at least one 0 that is inserted into each of the at least one field of the first DCI so that the field of the first DCI has a same size as a corresponding field of the third DCI.

11. The UE of claim 7,
wherein the zero-padding in the at least one field of the first DCI comprises at least one 0 that is inserted into a most significant bit (MSB) position within each of the at least one field of the first DCI.

12. The UE terminal of claim 7,
wherein validating the first DCI is performed based on one or more specific fields of the first DCI that identify a usage of the first DCI, wherein the one or more specific fields of the first DCI are positioned after a common field of the first DCI that is configured regardless of the usage of the first DCI.

13. The method of claim 1, wherein validating the first DCI is performed based on a new data indicator (NDI) in the first DCI having a value of 0.

14. The method of claim 1, wherein the DCI format of the first DCI, the second DCI, and the third DCI is a "DCI format 0_1".

15. The UE of claim 7, wherein validating the first DCI is performed based on a new data indicator (NDI) in the first DCI having a value of 0.

16. The UE of claim 7, wherein the DCI format of the first DCI, the second DCI, and the third DCI is a "DCI format 0_1".

* * * * *